(12) United States Patent
Yuan et al.

(10) Patent No.: US 9,234,068 B2
(45) Date of Patent: Jan. 12, 2016

(54) METHOD FOR PREPARING AQUEOUS POLYACRYLATE MODIFIED POLYURETHANE DISPERSIONS

(75) Inventors: Caideng Yuan, Hong Kong (CN);
Guohua Chen, Hong Kong (HK);
Xixiang Zhang, Hong Kong (HK);
Zongjin Li, Hong Kong (HK); Zhimeng Liu, Dongguan (CN)

(73) Assignee: The Hong Kong University of Science and Technologhy, Clear Water Bay, Kowloon, Hong Kong (CN)

(*) Notice: Subject to any disclaimer, the term of this patent is extended or adjusted under 35 U.S.C. 154(b) by 93 days.

(21) Appl. No.: 12/285,372

(22) Filed: Oct. 2, 2008

(65) Prior Publication Data
US 2009/0111934 A1 Apr. 30, 2009

Related U.S. Application Data

(60) Provisional application No. 60/997,108, filed on Oct. 2, 2007, provisional application No. 61/129,801, filed on Jul. 21, 2008.

(51) Int. Cl.
*C08G 18/08* (2006.01)
*C08G 18/62* (2006.01)
(Continued)

(52) U.S. Cl.
CPC ........ *C08G 18/6254* (2013.01); *C08G 18/0823* (2013.01); *C08G 18/12* (2013.01);
(Continued)

(58) Field of Classification Search
CPC ....................................................... C08G 18/08
USPC ........................................................ 524/507
See application file for complete search history.

(56) References Cited

U.S. PATENT DOCUMENTS 3,705,164 A * 12/1972 Honig et al. .................. 524/591
4,198,330 A * 4/1980 Kaizerman et al. .......... 523/501
(Continued)

FOREIGN PATENT DOCUMENTS

| CN | 1129240 A | 8/1996 |
|---|---|---|
| CN | 1597739 A | 3/2005 |
| JP | 09-165407 | 6/1997 |

OTHER PUBLICATIONS

Kukanja, D., et al., "The Structure and Properties of Acrylic-Polyurethane Hybrid Emulsions and Comparison with Physical Blends", *Journal of Applied Polymer Science*, vol. 78, No. 1, pp. 67-80, (2000), John Wiley & Sons, Inc.
(Continued)

*Primary Examiner* — Jane L Stanley
(74) *Attorney, Agent, or Firm* — Nath, Goldberg & Meyer; Jerald L. Meyer; Tanya E. Harkins

(57) ABSTRACT

A novel method for the preparation of an aqueous polyacrylate modified polyurethane dispersion is disclosed. The preparation method includes three main steps:
a) preparation of polyacrylate polymer or copolymer emulsion;
b) preparation of polyurethane prepolymer with carboxylic groups and neutralization treatment to the carboxylic groups; and
c) dispersion and chain-extension of polyurethane prepolymer by adding the polyacrylate emulsion into the polyurethane prepolymer under vigorous agitation, or other mechanical operation.

The aqueous polyacrylate modified polyurethane dispersion has self-crosslinkability when an unsaturated acetoacetoxy compound is used for the preparation of the polyacrylate emulsion.

18 Claims, 5 Drawing Sheets

(51) Int. Cl.
*C08G 18/12* (2006.01)
*C08G 18/66* (2006.01)
*C08G 18/67* (2006.01)
*C08G 18/75* (2006.01)
*C08G 18/76* (2006.01)
*C09D 175/04* (2006.01)

(52) U.S. Cl.
CPC .......... *C08G18/6692* (2013.01); *C08G 18/675* (2013.01); *C08G 18/755* (2013.01); *C08G 18/7621* (2013.01); *C09D 175/04* (2013.01); *C08G 2270/00* (2013.01)

(56) References Cited

U.S. PATENT DOCUMENTS

| | | | |
|---|---|---|---|
| 4,644,030 A * | 2/1987 | Loewrigkeit et al. | 524/457 |
| 5,169,884 A * | 12/1992 | Lindemann et al. | 524/44 |
| 5,173,526 A * | 12/1992 | Vijayendran et al. | 524/457 |
| 5,556,912 A | 9/1996 | Brock et al. | |
| 5,594,065 A * | 1/1997 | Tien et al. | 524/507 |
| 5,670,600 A | 9/1997 | Nienhaus et al. | |
| 5,688,859 A | 11/1997 | Schneider et al. | |
| 5,876,802 A | 3/1999 | Brünnemann et al. | |
| 5,973,074 A * | 10/1999 | Campbell et al. | 525/125 |
| 6,022,925 A * | 2/2000 | Tomko et al. | 524/547 |
| 6,063,861 A | 5/2000 | Irle et al. | |
| 6,166,127 A * | 12/2000 | Tomko | 524/507 |
| 6,166,150 A | 12/2000 | Wilke et al. | |
| 6,201,057 B1 * | 3/2001 | Porter | 524/501 |
| 6,239,209 B1 * | 5/2001 | Yang et al. | 524/507 |
| 6,458,866 B1 * | 10/2002 | Oppermann et al. | 522/174 |
| 6,515,068 B1 | 2/2003 | Swora et al. | |
| 6,566,438 B1 * | 5/2003 | Ingrisch et al. | 524/507 |
| 6,579,932 B1 * | 6/2003 | Schipper et al. | 524/501 |
| 6,635,706 B1 | 10/2003 | Petschke et al. | |
| 6,787,596 B1 * | 9/2004 | Maier | C08F 283/006 524/507 |
| 7,001,952 B2 | 2/2006 | Faler et al. | |
| 7,598,315 B2 * | 10/2009 | Lubnin | 524/589 |
| 2002/0177654 A1 * | 11/2002 | Erdem et al. | 524/801 |
| 2003/0050347 A1 * | 3/2003 | Faust et al. | 516/38 |
| 2003/0187136 A1 * | 10/2003 | Maier et al. | 525/63 |
| 2006/0148980 A1 * | 7/2006 | Tielemans et al. | 524/591 |
| 2008/0090678 A1 * | 4/2008 | Kim | A63B 37/0003 473/378 |
| 2008/0188605 A1 * | 8/2008 | Lubnin | 524/432 |
| 2010/0015341 A1 * | 1/2010 | Erdem et al. | 427/385.5 |
| 2010/0160480 A1 * | 6/2010 | Tomko et al. | 522/174 |

OTHER PUBLICATIONS

González, I. et al., "Unexpected Crosslinking During Acetoacetoxy Group Protection on Waterborne Crosslinkable Latexes", *Macromolecular Material and Engineering*, No. 291, pp. 1185-1193, (2006), WILEY_VCH Verlag GmbH & Co. KGaA, Weinheim.

Mather, B.D., et al., "Michael addition reactions in macromolecular design for emerging technologies", *Progress in Polymer Science*, Vo. 31, pp. 487-531, (2006), Elsevier Ltd.

Chinese Office Action, citing CN 1129240A, dated Sep. 29, 2011.

* cited by examiner (a) PA/PU dispersion by physical method (b) PA/PU dispersion by chemical method (c) PA/PU dispersion according to the present invention The method according to the present invention (a) PA particles (b) PA/PU particles (a) Particle size data obtained by PA and PA/PU particles shown in Fig. 3

(b) and (c): Particle size data obtained with different PA particles under different conditions (a) water-resistance of PU (b) water-resistance of PA/PU

METHOD FOR PREPARING AQUEOUS POLYACRYLATE MODIFIED POLYURETHANE DISPERSIONS

CROSS-REFERENCE TO RELATED APPLICATIONS

Pursuant to 35 U.S.C. §119(e), this application claims the benefit of U.S. Provisional Applications, Ser. No. 60/997,108 and Ser. No. 61/129,801, filed on Oct. 2, 2007 and on Jul. 17, 2008, respectively, in the name of Caideng Yuan et al. They are entitled "Method For Preparing Aqueous Polyacrylate Modified Polyurethane Dispersions" and "Method for Preparing Waterborne Self-Crosslinkable Polyacrylate-Polyurethane Hybrid Dispersion", respectively, and said provisional applications are hereby incorporated by reference as if they were fully set forth herein.

FIELD OF THE INVENTION

The present invention relates to a method of preparing an aqueous polyurethane dispersion. In particular, the present invention relates to a method of preparing an aqueous polyacrylate modified polyurethane dispersion with no use of volatile organic solvents. The products of such methods are further contemplated herein. The modified polyurethane dispersion can be used in the fields of coatings, particularly woodenware coatings, adhesives and ink industries, etc.

BACKGROUND OF THE INVENTION

Over the decades, there has been a concerted effort to reduce atmospheric pollution caused by volatile solvents which are emitted during painting processes. Due to environmental concerns, volatile organic compounds (VOCs) have come under strict regulation by the government. Therefore, one of the major goals of the coating industry is to minimize the use of organic solvents by formulating waterborne coating compositions which provide a smooth, high gloss appearance, as well as good physical properties including resistance to acid rain. While the solvent-type coatings provide many benefits, such as that they are fast-drying, have a high hardness, a high abrasion-resistance, a high water-resistance, a high chemical-resistance and a low price, the waterborne coatings have environment-friendly benefits in that they are not flammable or explosive. The waterborne coatings use water as the system solvent and contain no poisonous chemicals. They require no or low amounts of volatile organic compounds.

In this context, aqueous polyurethane (PU) dispersions or emulsions have been replacing the solvent-type products in the fields of coatings, adhesives and ink. However, pure aqueous PU dispersions have some inherent drawbacks. In order to form a stable aqueous dispersion, the hydrophilic groups, for example, carboxylic, sulfonic, ammonium and other ionic groups should be introduced into the PU molecular chains. This modification however may lead to lower water-resistance of the aqueous PU dispersion compared to the solvent-type products. Therefore, it is necessary to modify the aqueous PU dispersions with other hard polymeric materials such as polyacrylates.

Polyacrylates (PAs) are the most important polymers used in modifying the PUs. The PA and the PU are complements in many aspects. The PU is advantageous in that it is cold-resistant, solvent-resistant, elastic and flexible, glossy and exhibits little change in hardness with changes in temperature, while the PU is disadvantageous in that it has low water-resistance and low mechanical strength. The PA is advantageous in that it has high mechanical properties and is anti-yellowing, aging-resistant and water-resistant, while the PA is disadvantageous in that it has low solvent-resistance and that the PA film is tacky under high temperature but brittle under low temperature. Accordingly, obviously the properties of the PU and the PA complement each other. The composite materials of PU and PA are more outstanding in terms of adhesion, film-formability, non-stickiness, weather-resistance, elongation and strength of the film than that of either the PA or the PU taken alone. Accordingly, since the development of PU, the modification of the PU by the PA has remained an active research topic in the art.

There are two kinds of modification to the PU by the PA: a physical method and a chemical method. The physical method is achieved by mechanical mixing. In the physical method, aqueous PA and PU dispersions (emulsions) are independently prepared first, and then both dispersions are mixed together under mechanical power. A high speed mechanical stirrer may be used for this purpose. It is a very convenient method that makes it easy to control the particle size and the stability of the dispersions. However, the properties of the mixed dispersion are often not very satisfactory, because the particles of PU and PA are separated in the dispersion and the phase separation occurs during film-formation. (D. Kukanja et al, *J. Appl. Polym. Sci.* 78, 67, 2000)

For these reasons, the chemical modification technology currently plays a more important role. The chemical method is achieved by post-polymerization of acrylates. In the chemical method, the PU dispersion can be prepared first, and then acrylates and other vinyl monomers can be polymerized in the PU dispersion. In most cases, core-shell emulsion polymerization is adopted. PU particles are used as core particles and the acrylates are polymerized in the PU particles due to high hydrophobicity of the acrylates. Therefore, the inverse core/shell structure is always obtained.

In addition, the free radicals are typically easily captured by N—H groups in the PU chains. As such, the PU can also serve as a chain transferring agent in the acrylates polymerization, and a graft of PA chains to PU chains is formed. Furthermore, if multi-double-bond (>2) unsaturated monomers are used in the emulsion polymerization, or multifunctional polyols or polyisocyanates are used in the preparation of PU, crosslinking and interpenetrating networks are formed in the core-shell particles. This leads to enhanced compatibility between the PU and the PA and the phase separation is minimized or even eliminated. This is likely the reason why the properties of the PU-PA composites produced by the chemical method are much better than those of the mixtures of both materials obtained by the physical method.

In the preparation of aqueous PU dispersions by the chemical method, a high viscosity for the prepolymer melt should be avoided so that good operability can be achieved in obtaining PU dispersions with a high molecular weight. For this purpose, such volatile organic solvents as acetone, methyl ethyl ketone, etc. are typically used in the reported literature or disclosed methods in the art. With the use of these solvents, the viscosity can be maintained at a low level. At the end of the preparation of aqueous PU dispersions, the solvents are typically removed from the dispersions under vacuum pressure.

For example, U.S. Pat. No. 5,556,912 discloses a preparation of aqueous binder dispersions including polyurethanes and water-based physically drying coating compositions containing these aqueous dispersions which are particularly suitable for plain and metallic colored base coats employed for automotive repair lacquer coatings. In the patent, the reaction proceeds in the presence of a solvent or in the presence of so-called reactive diluents, such as methyl ethyl ketone, methyl isobutyl ketone, acetone, tetrahydrofuran, toluene and xylene, which are subsequently eliminated by distillation.

In the chemical method, certainly acrylates and other ethylene unsaturated monomers without active-hydrogen in the molecules can be used as a solvent at first, and then they can be radical polymerized after the prepolymer of PU has been dispersed in water. For example, U.S. Pat. No. 7,001,952 discloses a preparation of aqueous PU dispersions including PU-acrylate particles dispersed in an aqueous medium.

In the stage of preparing the PU prepolymer by the chemical method, for example, a mixture of methyl methacrylate and butyl acrylate can be added into a reactor, so the viscosity of the reaction system is very low. After water is fed into the reactor and the PU prepolymer is extended and dispersed, radical initiators are added into the dispersions to create the emulsion copolymerization of methyl methacrylate and butyl acrylate. In said U.S. Pat. No. 7,001,952, in order to enhance the dispersibility and to reduce the particle size of the dispersion, a microfluidizer is used after the dispersion. The initiators adopted in the patent are of the redox-type, i.e. t-butylhydroperoxide/ferrous ammonium sulfate/sodium metabissulfate and isoascorbic acid/hydrogen peroxide.

In another U.S. Pat. No. 6,635,706, polyols, dimethylol propanic acid, bis(4-isocyanatocyclohexyl)methane and N-methylpyrrolidinone (cosolvent) are used in the preparation of PU prepolymer. A mixture of methyl methacrylate and butyl acrylate is added into the solution and then dispersed in water. At the final stage, emulsion polymerization is carried out under 75° C., by using Vazo-52 [2,2'-azobis(2,4-dimethylpentanenitrile)] as an initiator, and then using ammonium persulfate, tertiary butyl hydroperoxide, cumene hydroperoxide and hydrosulfite successively to accelerate the polymerization.

In addition, Japanese Patent No. 9 165 407 and U.S. Pat. No. 6,635,706 disclose that active acrylates, i.e., acrylates with hydroxyl groups, can react with a —NCO terminated polyurethane prepolymer so that vinyl groups can be introduced into the prepolymer chains. The advantages of this technology are: (i) the prepolymer with double bonds can copolymerize with acrylates in the later stage so that the PU and the PA can be crosslinked; (ii) NCO groups in the prepolymer are consumed by the hydroxyl groups in the active acrylates; and (iii) extending reaction of the prepolymer in the water can be ignored so that the dispersed phase in the aqueous PU emulsion is of low molecular weight materials, even oligomers of PUs. Thus, a stable and uniform emulsion can be obtained easily.

The PU can be modified by the PA and other polymer resins together. In U.S. Pat. No. 5,688,859, PAs and alkyd resins with hydroxyl and carboxylic groups are synthesized first, and then diisocyanates react with a mixture of the two resins in solution. Finally, neutralization and dispersion are conducted subsequently. The PU/PA hybrid emulsions obtained are in good appearance and the polymer film is of excellent properties. The solvent used in the manufacturing, however, is more than 5% in the product.

U.S. Pat. No. 6,166,150 also discloses that alkyd resins and PAs are used to modify the PU. The alkyd resins and the PU were prepared in organic medium, respectively, and then were blended. The solution was neutralized and dispersed in water afterwards. Acrylate monomers were then copolymerized in the alkyd resin-PU dispersion. The radical polymerization of acrylates would last for 10 hours.

Many more patents and research papers disclose the preparation of aqueous PA modified PU dispersions. However, the balance of polymer properties and operation complexity is still a challenge. Although the emulsion polymerization of acrylate monomers always leads to excellent properties, either the use of organic solvents or the tedious operations have to be considered as elements requiring improvement. The productivity is therefore markedly limited. In the PU industry, in fact, antioxidants are necessary to be added into most polyols, which will inhibit the radical polymerization of vinyl monomers drastically. Furthermore, as mentioned above, although the N—H groups in the PU chains are in favor of the grafting reaction of PA to PU, this "side reaction" will slow down the radical polymerization because the radicals are very easily transferred to PU chains, leading to the low conversion of the acrylate monomers into polymerization. As a result, the monomer conversion of the acrylates emulsion polymerization in the presence of PU is very low, ca. 60~70%. In order to enhance the monomer conversion, some intensified strategies should be adopted in the radical polymerization stage, for example, either to extend the reaction time, or to use composite initiators as in U.S. Pat. No. 6,635,706. Besides, some PA/PU hybrid emulsions are yellowish or light brown. The appearance of these products looks unattractive. Therefore, it is an urgent need to conveniently produce PA/PU hybrid dispersions to obtain a high yield of the desired product.

In Chinese Patent No. 1 597 739A, a method is disclosed to prepare the PA emulsion in advance and then add the PA emulsion into a PU prepolymer solution directly during the dispersion stage. The method is easy to control and the obtained PA/PU hybrid bears enhanced properties. However, according to this method, volatile organic solvents must be used in the PU prepolymerization stage and the volatile organic solvents must be removed under vacuum at the end of process.

Meanwhile, as a way to achieve the desired properties of the PA/PU composite materials, chemical crosslinking between the PA and the PU chains has been employed. In this regard, one effective and feasible strategy is to adopt a two-packaged PA/PU system. There are quite a few patents found for two-packaged aqueous PA/PU coatings production, such as U.S. Pat. Nos. 6,515,068, 5,670,600 and 5,876,802.

U.S. Pat. No. 5,675,600 discloses a two-packaged PA/PU system. In this system, water-dilutable acrylates copolymers are prepared via solution polymerization using ethoxyethyl propionate; the polyacrylates are dispersed in water; and then the organic solvent is finally removed from the dispersion by azeotropic distillation. The aqueous polyacrylate dispersion can be blended with a water-dilutable polyisocyanate commercially available so that a transparent topcoat can be obtained. It is obvious that in this two-part PA/PU coating system, the PU component is used as a crosslinker and the PA is the main resin for the coating. Therefore, the properties of the film will mainly depend on the polyacrylate component.

U.S. Pat. No. 5,876,802 is an updated version of U.S. Pat. No. 5,675,600, with the essential strategy not changed.

U.S. Pat. No. 6,515,068 also uses the water-dilutable polyisocyanate as a crosslinker for the polyacrylate with hydroxyl groups.

Although two-packaged coatings provide a high performance, such coatings are not convenient for painting operations. Two components must be stored in separate containers and they must be mixed in accordance with a specific ratio before being applied. In this regard, the pot life of the "finished" coating products is always shorter than 3 hours. Therefore, a one-packaged product will tend to be superior to a two-packaged product in terms of operability.

Further, it will be much better if the crosslinking of PA and PU chains can be achieved under ambient temperature. For self-crosslinking systems under ambient temperature, some pairs of groups can be considered, for instance, epoxide/primary amine and acetoacetoxy systems.

U.S. Pat. No. 6,063,861 discloses a preparation of a pure polyurethane aqueous dispersion using a hydroxyl carboxylic acid method. In this patent, the PU is extended with amines and then the acrylates monomers and Acetoacetoxyethyl methacrylate (AAEM) are polymerized in the presence of the PU dispersion. The results of the patent show that AAEM in this system can lead to the self-crosslinking of the PA/PU hybrid dispersion.

In the present application, a method of preparing an aqueous PA modified PU dispersion with high stability is provided, without the use of volatile organic solvents but with high productivity and convenience in operation. Further, as a way to improve the properties of the modified PU dispersion, a method of preparing an aqueous PA modified PU dispersion with self-crosslinkability is provided.

SUMMARY OF THE INVENTION

It is an object of the present invention to provide a method of preparing an aqueous PA modified PU dispersion, with no use of volatile organic solvents but with high productivity and stability, and convenience in operation. The aqueous PA modified PU dispersion can be used in the coatings, adhesives and ink industries.

It is another object of the present invention to provide an aqueous PA modified PU dispersion wherein PA particles are present in the dispersion as encapsulated in PU particles, adhered to the surface of PU particles and dispersed in between the PU particles.

It is still another object of the present invention to provide coatings or films obtainable by the aqueous PA modified PU dispersion that are stable and resistant to abrasions, chemicals and stains.

Further, it is an object of the present invention to provide a method of preparing an aqueous PA modified PU dispersion with self-crosslinkability, as well as high stability, productivity and convenience in operation. Likewise, the aqueous PA modified PU dispersion with self-crosslinkability can be used in the coatings, adhesives and ink industries.

It is another object of the present invention to provide an aqueous PA modified PU dispersion with self-crosslinkability and high stability.

It is still another object of the present invention to provide coatings or films obtainable by the aqueous PA modified PU dispersion with self-crosslinkability that are stable and resistant to abrasions, chemicals and stains.

Accordingly, in one embodiment of the present invention, the method of preparing an aqueous polyacrylate modified polyurethane dispersion comprises: a) preparing a polyacrylate emulsion; b) preparing a polyurethane prepolymer; and c) dispersing and extending said polyurethane prepolymer in the presence of said polyacrylate emulsion. According to this method, a mechanical mixing operation may be used but the core-shell structure of the particles can be achieved. This method can thus be called a combination of the physical and chemical methods.

According to another embodiment of the present invention, the polyacrylate emulsion comprises a polyacrylate polymer or copolymer selected from the group consisting of an acrylate homopolymer, an acrylates copolymer and a copolymer of acrylates with vinyl monomers. Preferably, the vinyl monomers are styrene and its derivatives, acrylonitrile, acrylamide and its derivatives, vinyl acetate and other vinyl carbonate (such as VeoVa® monomers) and other compounds with ethylenic unsaturation. The polyacrylate emulsion preferably further comprises anionic, non-ionic, or a mixture of anionic and non-ionic surfactants. The polyacrylates polymer and/or copolymer are synthesized with methyl (meth)acrylate, ethyl acrylate, propyl acrylate, butyl (meth)acrylate, (ethyl)hexyl (meth)acrylate and other acrylate monomers.

According to a further embodiment of the present invention, the polyurethane prepolymer contains carboxylic groups and is synthesized using polyisocyanates, polyols, hydroxyl carboxylic acids and/or extending agents. The polyols preferably include poly(ethylene glycol), poly(propylene glycol), poly(tertrahydrofuran), and have a molecular weight of 400 to 3000. The hydroxyl carboxylic acids preferably include dimethylol propanic acid, dimethylol butyric acid, malic acid and citric acid. The hydroxyl carboxylic acids include dihydroxyl carboxylic acid, such as dimethylol propanic acid and dimethylol butyric acid. The extending agents include a multi-hydroxyl compound with a low molecular weight of <400. The multi-hydroxyl compound with law molecular weight is preferably one selected from ethanediol, propanediol, butanediol, 2-butyne-1,4-diol, trimethylolpropane, tetramethylolmethane, other homologous diols or polyols, and mixtures thereof. 2-butyne-1,4-diol is preferred. The polyurethane prepolymer is synthesized, with all the hydroxyl components fed into the reactor in a batch. Further, the PU prepolymer is synthesized with no use of organic solvents or with a small amount of a high boiling point solvent to dissolve the solid monomers. The high boiling point solvent, if present, preferably includes N-methyl-2-pyrrolidinone.

According to still another embodiment of the present invention, the polyacrylate emulsion is added into the polyurethane prepolymer in a batch under high speed agitation In another embodiment of the present invention, an aqueous polyacrylate modified polyurethane dispersion is obtained by a method comprising a) preparing a polyacrylate polymer or copolymer emulsion, b) preparing a polyurethane prepolymer with carboxylic groups, and c) dispersing and extending said polyurethane prepolymer in the presence of said polyacrylate emulsion, where polyacrylate particles are present in the dispersion as encapsulated in polyurethane particles, adhered to the surface of polyurethane particles or dispersed in between. In the dispersion, the total solid content of modified polyurethane dispersion is preferably in the range of 20% to 50% and the weight ratio of dry polyacrylate to polyurethane is preferably in the range of 10:90 to 90:10.

In still another embodiment of the present invention, coatings are obtained with the aqueous polyacrylate modified polyurethane dispersion, and substrates are obtained with the coatings.

Further, in still another embodiment of the present invention, a method of preparing an aqueous polyacrylate modified polyurethane dispersion with self-crosslinkability is provided, which comprises a) preparing a polyacrylate polymer or copolymer emulsion with functional groups; b) preparing a polyurethane prepolymer with carboxylic acid; and c) dispersing and extending said polyurethane prepolymer in the presence of said polyacrylate emulsion. According to this method, the functional group is preferably acetoacetoxy group and the polyacrylate copolymer is prepared by copolymerization of an unsaturated acetoacetoxy compound with (metha)acrylates and/or other vinyl monomers, preferably, (metha)acrylates selected from the group consisting of methyl (meth)acrylate, ethyl acrylate, propyl acrylate, butyl (meth)acrylate, (ethyl)hexyl (meth)acrylate, other acrylate monomers, and combinations thereof. Further, according to this method, the unsaturated acetoacetoxy compound is preferably acetoacetoxyethyl methacrylate. According to an embodiment of this method, the polyurethane prepolymer contains carboxylic groups and is synthesized using polyisocyanates, polyols, hydroxyl carboxylic acids and/or extending agents. The polyols preferably include poly(ethylene glycol), poly(propylene glycol), poly(tertrahydrofuran), and have a molecular weight of 400 to 3000. The hydroxyl carboxylic acids preferably include dimethylol propanic acid, dimethylol butyric acid, malic acid and citric acid. The hydroxyl carboxylic acids include dihydroxyl carboxylic acid, such as dimethylol propanic acid and dimethylol butyric acid. The extending agents can include multi-hydroxyl compounds with a low molecular weight of <400. The multi-hydroxyl compound with law molecular weight is preferably one selected from ethanediol, propanediol, butanediol, 2-butyne-1,4-diol, trimethylolpropane, tetramethylolmethane, other homologous diols or polyols, and mixtures thereof. 2-butyne-1,4-diol is preferred. The polyurethane prepolymer is synthesized, with all the hydroxyl components fed into the reactor in a batch. Further, the PU prepolymer is synthesized with no use of organic solvents or with a small amount of a high boiling point solvent to dissolve the solid monomers. The high boiling point solvent, if present, preferably includes N-methyl-2-pyrrolidinone.

Further, in still another embodiment of the present invention, an aqueous polyacrylate modified polyurethane dispersion with crosslinkability at room temperature is obtained by the method comprising a) preparing a polyacrylate polymer or copolymer emulsion with functional groups, b) preparing a polyurethane prepolymer with carboxylic groups, and c) dispersing and extending said polyurethane prepolymer in the presence of said polyacrylate emulsion, where the functional groups react to form crosslinking with the PU when the modified dispersion is painted. In the dispersion, the total solid content of modified polyurethane dispersion is preferably in the range of 20% to 50% and the weight ratio of dry polyacrylate to polyurethane is preferably in the range of 10:90 to 90:10.

BRIEF DESCRIPTION OF THE DRAWINGS

FIG. 1(a) shows a simplified drawing of the PA/PU dispersion prepared by the physical method in prior art using mechanical mixing. FIG. 1(b) shows a simplified drawing of the PA/PU dispersion prepared by a chemical method in prior art using post-polymerization of acrylates. FIG. 1(c) shows a simplified drawing of the PA/PU dispersion prepared according to the present invention.

FIG. 3(a) shows the PA particles obtained by the method according to the present invention. FIG. 3(b) shows a SEM image of large-sized PA/PU particles prepared according to the present invention.

FIG. 4(a) shows the particle size data for the samples demonstrated in FIG. 3. FIGS. 4(b) and 4(c) show the particle size data for other samples obtained from different conditions according to the present invention having.

FIG. 5(a) shows the water-resistance of the film obtained from the modified PA/PU dispersion and FIG. 5(b) shows the water-resistance of the film obtained from the pure PU.

DETAILED DESCRIPTION OF THE INVENTION

Definitions

Figure 1:
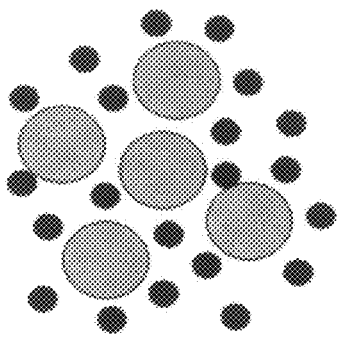
FIG. 1 shows a comparison of a prior art method with the present method for the preparation of the PA/PU dispersion.
Figure 1:
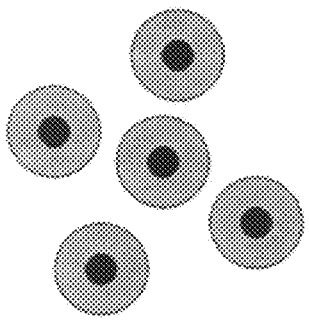
Figure 1:
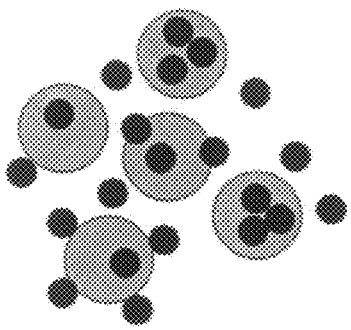

In the present application, the term "polyurethane" or "PU" is a generic term used to describe polymers including oligomers (e.g., prepolymers) which contain multiple urethane groups, i.e., —O—C(=O)—NH—, regardless of how they are made. As is well known, polyurethanes can contain additional groups such as urea, allophanate, biuret, carbodiimide, oxazolidinyl, isocyanurate, uretdione, ether, ester, carbonate, etc., in addition to urethane groups. Typically, the prepolymers will be above 1,000 or 2,000 Daltons in number average molecular weight and if the chain is extended during processing, can reach number average molecular weights in the millions of Daltons.

The term "polyacrylate" or "PA" as used herein is meant to embrace within its scope those polymers or resins resulting from the polymerization of one or more acrylates such as, for example, methyl acrylate, ethyl acrylate, butyl acrylate, 2-ethylhexyl acrylate, etc. as well as the methacrylates such as, for instance, methyl methacrylate, ethyl methacrylate, butyl methacrylate, hexyl methacrylate, etc. Copolymers of the above acrylate and methacrylate monomers are also included within the term "polyacrylate" as it appears herein. The polymerization of the monomeric acrylates and methacrylates to provide the PA emulsions useful in the practice of the invention may be accomplished by any of the well known polymerization techniques.

The phrase "with no use of volatile organic solvents" used in the present application is meant to describe that the use of volatile organic solvents such as acetone, methyl ethyl ketone, etc. is not necessary in the method according to the present invention. However, the term may also mean that a small amount of a high boiling point solvent may be added to dissolve monomers, less than about 5% by weight based on the weight of total dispersions.

Preparation of an Aqueous PA Modified PU Dispersion

For the preparation of PA/PU hybrid dispersions, some key factors must be considered: (i) high viscosity of the PU prepolymer; (ii) difficulties in radical polymerization of acrylates in the presence of PU; (iii) co-promotion of PA and PU properties; and (iv) easy operation and high productivity.

In order to improve the operability, it is better to avoid the polymerization of acrylates in the presence of PU. As is well known, the emulsion polymerization of acrylates is very easily designed and controlled, including the particle size and its distribution, morphology of the particles and so on. The engineering-friendly structures and properties of acrylate emulsion polymerization is the essential driving force for researchers working in this field. With acrylate emulsion polymerization, a specific core-shell structure and interpenetrating networks can be obtained and specific groups can be located in the latex particles. Therefore, the PA emulsion can be prepared to have desired properties. However, if the PA emulsion is used to modify the PUs, improved properties must be achieved. In other words, the PA cannot be mixed with PU directly for the preparation of PA/PU hybrid dispersions. Rather, it is necessary to produce a much tighter connection between the PA and PU than is produced by the physical mixing of the two dispersions.

Figure 2:
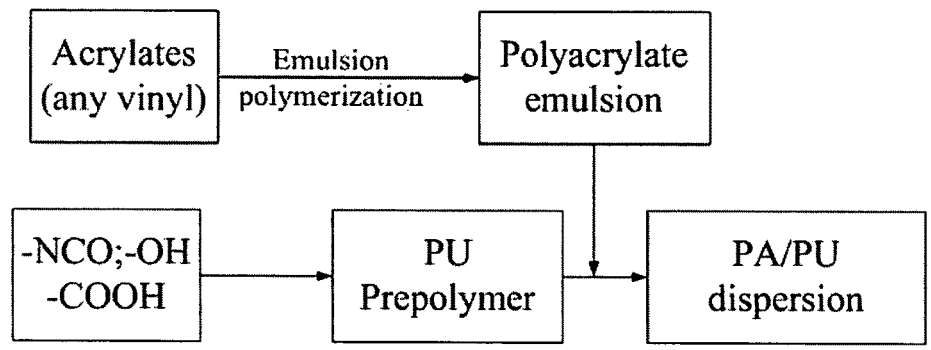
FIG. 2 shows a diagram of preparing the PA/PU dispersion according to the present invention.

In the present invention, mechanical mixing operation is used but the core-shell structure of the particles are achieved. The present method can thus be called a combination of the physical and chemical methods. FIG. 1 shows the comparison of a prior art method with the present method for the preparation of the PA/PU dispersions. FIG. 1 (a) shows a simplified drawing of the PA/PU dispersion prepared by the physical method using mechanical mixing. FIG. 1 (b) shows a simplified drawing of the PA/PU dispersion prepared by the chemical method using post-polymerization of acrylates. FIG. 1 (c) shows a simplified drawing of the PA/PU dispersion prepared according to the present invention. FIG. 2 shows the diagram of the present method of preparing the PA/PU dispersion.

Further, in order to improve the desired properties of the PA/PU dispersions, especially hardness, abrasion-resistance, water-resistance and solvent-resistance, in the present invention the crosslinking between the PA and the PU is preferably obtained.

In this regard, to obtain a crosslinkable PA/PU dispersion, functional groups such as active-hydrogen can be introduced into the PA chains or ethylene unsaturated groups can be inserted into the PU chains, or both techniques can be employed. In the present invention, although few isocyanate groups in the PU prepolymers remain during the dispersion into water, the residual isocyanate groups can possibly crosslink the PU chains with the PA chains. However, without a specific polymerization process, the degree of crosslinking is always limited and thus additional crosslinkers should be introduced into the PA/PU system. Furthermore, the self-crosslinkability under ambient temperature is very important for the application of the product. Accordingly, specific reactive radicals should be introduced into the PA and the PU chains, respectively.

The acetoacetoxy group may be most suitable to meet the objective of the crosslinking at room temperature because it is so reactive that the acetoacetoxy groups can readily react with many kinds of active-hydrogen or unsaturated compounds under ambient (room) temperature. Accordingly, in the present invention, an unsaturated acetoacetoxy compound is preferably employed for the self-crosslinking, namely to introduce the reactive radical into the PA, at room temperature between the PA and the PU. Likewise, amine groups are employed to introduce the radical groups into the PU for the crosslinking.

Accordingly, in the present invention, an aqueous PA modified PU dispersion with or without self-crosslinkability can be manufactured in three steps:

a) Preparing the PA polymer or copolymer emulsion. Anionic surfactants, non-ionic surfactants, or combinations thereof may be used. For a crosslinkable PA/PU dispersion, an unsaturated acetoacetoxy compound can be used for obtaining the PA copolymer.

b) Preparing the prepolymer of PU. Polyisocyanates, polyols, hydroxyl carboxylic acids and extending agents such as BDO are mixed and heated in the reactor. A small amount of high boiling point solvent may be added to accelerate the dissolution of solid monomers, if necessary. Polyisocyanates are added to the reactor to react with hydroxyl components at once with other necessary components. The reaction temperature is about 70 to 120° C. After the prepolymerization is completed, neutralizing treatment can be carried out under lower temperature; and c) Dispersing and extending said PU prepolymer in water in the presence of said PA emulsions. Under low temperature, PA emulsions prepared in step (a) are added into the PU prepolymer solution prepared in step (b) under vigorous agitation (>1000 rpm). After the completion of the dispersion, the hybrid emulsion can be kept stirred and heated for a period of time to enhance the conversion of residual isocyanate groups and other functional groups in PA, if necessary.

The method according to the present invention provides some benefits, such as that: i) no volatile solvent is used in the preparation of the PU prepolymer, so the reaction temperature can be set higher to reduce the viscosity of the reactant; (ii) the PA emulsion is prepared in advance and not synthesized in the presence of PU particles; (iii) PA particles and PU particles are mixed in the dispersion, with PA particles wrapped in, adhered to and/or existed in between PU particles, helping to enhance the properties of the polymer composite; and (iv) the operation is easy to control and the productivity is quite high. Furthermore, when an unsaturated acetoacetoxy compound is used for preparation of the PA copolymer emulsion, the crosslinking between the PA and the PU can be obtained, improving the properties of the PA/PU composite particle.

Step 1

Preparation of PA Emulsion

The preparation of a PA emulsion in advance before dispersing and extending the PU prepolymer simplifies the modification of PU by PA in the present invention. Accordingly, acrylate emulsion polymerization in the presence of the PU dispersion is avoided in the present invention, providing an improved operability. Due to the excellent designability and controllability in particle morphology and properties of the PA emulsion, it helps to improve the properties of the PA/PU dispersion obtained.

The PA emulsion may comprise a homopolymer of acrylates, a copolymer of acrylates, a copolymer of acrylates with other vinyl monomers, and/or mixtures thereof. With the consideration of properties and prices of the products, all traditional co-monomers may be used to prepare the polymers and copolymers.

Non-limiting examples of suitable acrylate monomers include styrene; esters of (meth)acrylic acid containing 1 to 18 carbon atoms in the alcohol radical, such as methyl methacrylate, butyl methacrylate, ethyl acrylate, butyl acrylate, cyclohexyl acrylate, 2-ethylhexyl acrylate and stearyl acrylate; di(meth)acrylic acid esters of diols, e.g. ethylene glycol, 1,4-butanediol or 1,6-hexanediol; (meth)acrylamide or (meth)acrylonitrile; and vinyl esters of aliphatic carboxylic acids containing 2 to 12 carbon atoms, such as vinyl acetate or versatic acid vinyl ester. The monomers including methyl (meth)acrylate, ethyl acrylate, butyl acrylate, hexyl acrylate, 2-ethylhexyl acrylate, acrylic acid, methacrylic acid, hydroxyethyl (meth)acrylate, hydroxypropyl (meth)acrylate and glycidyl methacrylate, are preferable.

Other vinyl monomers that may be used in the present invention to copolymerize with acrylates include, but are not limited to, styrene and its derivatives, acrylonitrile, acrylamide and its derivatives, vinyl acetate and other vinyl carbonate, such as VeoVa® monomers, and other compounds having vinyl bonds.

Further, the PA emulsion may comprise a polyacrylate copolymer having functional groups which may form the crosslinking between the PA and the PU. Suitable are monomers containing functional groups, e.g., hydroxy, carbonyl or acid groups, such as hydroxyethyl acrylate, hydroxyethyl methacrylate, hydroxypropyl methacrylate, acetoacetoxyethyl methacrylate, acrylic acid and methacrylic acid.

Acetoacetoxy system is preferably. Accordingly, in one embodiment of the present invention, an unsaturated acetoacetoxy compound is copolymerized with acrylates, methacrylates, and/or other vinyl monomers. Acetoactoexy group is well known for the Michael Addition reaction (Brian D. Mather et al. "Michael addition reactions in macromolecular design for emerging technologies", Progress in Polymer Science, Vol 31, pp 487-531, 2006). The general formula for the acetoacetoxy compounds is:

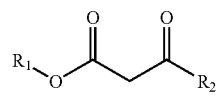

Because of its special molecular structure, acetoacetoxy is very active to many kinds of compounds, including olefins and alkynes, (meth)acrylates and cyanoacrylates, acrylonitrile, acrylamide and their derivatives, maleimides, vinyl sulfones, vinyl ketones, nitro ethylenes, α,β-unsaturated aldehydes, vinyl phosphonates, vinyl pyridines, azo compounds and even β-keto acetylenes and acetylene esters, etc. All these compounds are typical electrophiles as a Michael acceptor, and can react with the nucleophilic Michael donor, acetoacetoxy group. Amongst all these compounds, the reaction of the acetoacetoxy group with (meth)acrylates and amines is of quite significant applicable value in the coatings and adhesive industries. Certainly, for the convenience of introducing the acetoacetoxy groups into polymer chains, a typical unsaturated acetoacetoxy compound is acetoacetoxyethyl methacrylate (AAEM). Its formula is:

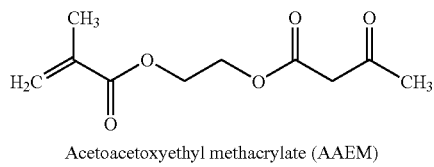

Acetoacetoxyethyl methacrylate (AAEM)

Therefore, acetoacetoxyethyl methacrylate (AAEM) is used as a functional monomer during the acrylate polymerization.

The acetoacetoxy groups can readily react with unsaturated vinyl groups. So, the significant crosslinking of the AAEM with acrylate monomers should be avoided during the emulsion polymerization. Fortunately, the Michael reaction of acetoacetoxy groups with the unsaturated groups in the acrylate should be initiated under alkaline conditions; unsaturated carboxylic monomers should thus be included in the formulation of acrylate emulsion polymerization. The examples of the unsaturated carboxylic monomers are acrylic acid, methacrylic acid, maleic acid, fumaric acid and so on.

In addition, the hydrolysis of the acetoacetoxy groups should be considered carefully. In aqueous systems, the acetoacetoxy group can react with water to produce a β-ketoacid which can further decompose to acetone and carbon dioxide. This "side reaction" may consume the acetoacetoxy groups and lead to the failure of crosslinking. This sidereaction can be avoided by alkaline-treatment. Acetoacetoxy groups can react with an alkaline compound. If a volatile alkaline such as ammonia is used, the reaction will be reversible. The reaction is shown as follows:

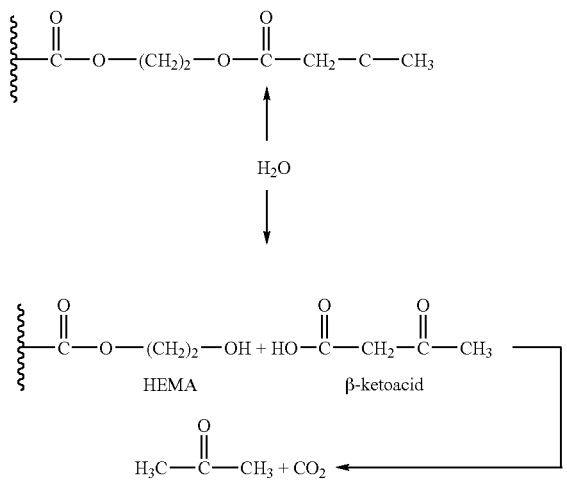

The hydrolysis of acetoacetoxy group

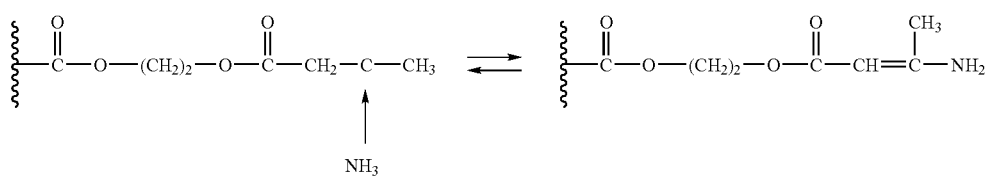

The protection of acetoacetoxy group with ammonia

With this mechanism, a volatile alkaline compound, such as ammonium, may be used in an embodiment of the present invention to protect the acetoacetoxy groups, after the acrylate emulsion polymerization. In other words, the emulsion can be adjusted to alkaline with ammonia. The unsaturated vinyl groups are completely polymerized in this stage so that the addition of ammonia will not lead to the consumption of the acetoacetoxy group by unsaturation. The alkaline is also helpful for the stability of the anionic emulsion.

The PA emulsion may comprise surfactants. The surfactants are preferably anionic surfactants, non-ionic surfactants or combinations thereof. Because the surface-active groups of PU are carboxylic groups, which are anionic groups in nature, non-ionic and/or anionic surfactants are preferably employed.

Examples of non-ionic surfactants that may be used for the preparation of PA emulsion include but are not limited to ethoxylated alcohols, ethoxylated alkylphenols such as OP serials and NP serials, ethoxylated acids, ethoxylated esters, ethylene oxide/propylene oxide block copolymers, and so on.

Examples of anionic surfactants that may be used for the preparation of PA emulsion include but are not limited to alkylbenzenesulfonates such as, for example, sodium tetrapropylenebenzenesulfonate and ABS; alkanesulfonates such as, for example, sodium 2-hexadecanesulfonate; ester sulfonates such as, for example, sodium-α-sulfooctadecanoic acid and methyl ester; alkyl sulfates such as, for example, sodium n-dodecyl sulfate; ether sulfates such as, for example, sodium nonylphenoltetraethoxy sulfate; phosphates such as, for example, sodium dodecyltetraethoxy phosphate; carbonates such as, for example, sodium nonylphenolpentaethoxy carboxylate, and so on.

For the polymerization of monomers, initiators may be used. Examples of suitable initiators include, but are not limited to, peroxides such as potassium peroxy-disulphate, ammonium peroxydisulphate, organic peroxides, organic hydroperoxides and hydrogen peroxide. Redox systems are preferably used, such as water-soluble, radical-producing non-ionogenic peroxides, e.g. t-butyl hydroperoxide, as the oxidation component, and reduction components such as formaldehyde sulphoxylate or ascorbic acid. Ammonium peroxydisulphate, also called ammonium persulfate, is preferably used.

The polymerization can be carried out using any technical method for preparing an aqueous emulsion polymerization, employing non-ionic and/or anionic surfactants. Commercial emulsion products may also be used as needed. The designs for the formulations and the reaction technology can be utilized to obtain specific particle morphologies and reactive functionalities so that the PA can match the PU dispersion to give good film properties. Preferably, the polymerization is carried out with the previously mentioned monomers and is initiated with radical initiators. In one embodiment of the present invention, the mixture of monomers and the initiator solution are respectively fed into a reactor over a defined period of time, such as 0.8 to 6 hours, preferably 3.5 hours. The initiator solution may comprise an initiator, a surfactant/emulsifier and water. The polymerization time span is dependent on the reaction conditions, such as temperature, initiator type and dosage, monomer dosage (solid content) and the reactivity of the monomers.

Emulsion polymerization is generally conducted at temperatures of about 75° C. to about 120° C., preferably 80° C. to 100° C., and more preferably 85° C. to 95° C. After the completion of the polymerization reaction, the polymer emulsion is allowed to cool down to ambient temperature.

Figure 3:
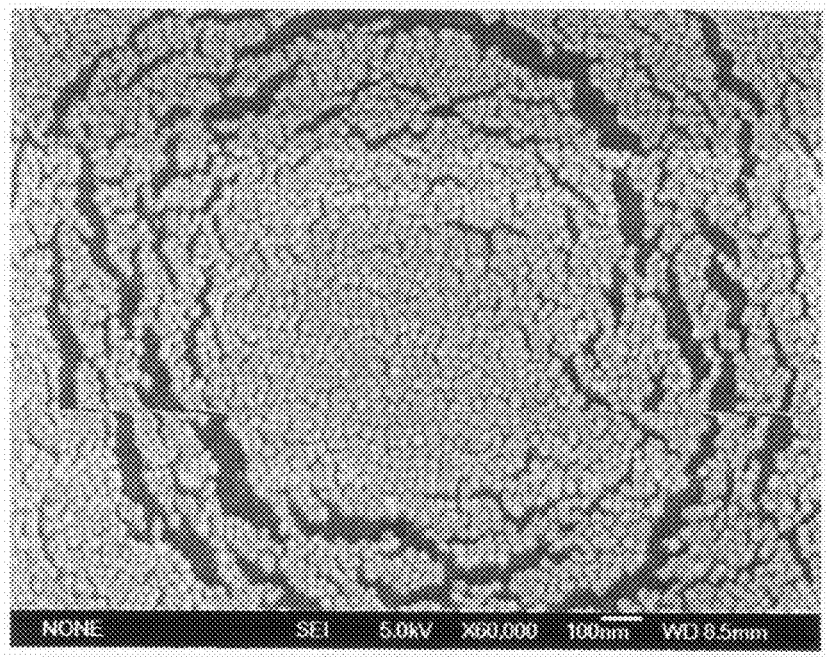
FIG. 3 shows SEM images of the PA particles and the modified PU particles.
Figure 3:
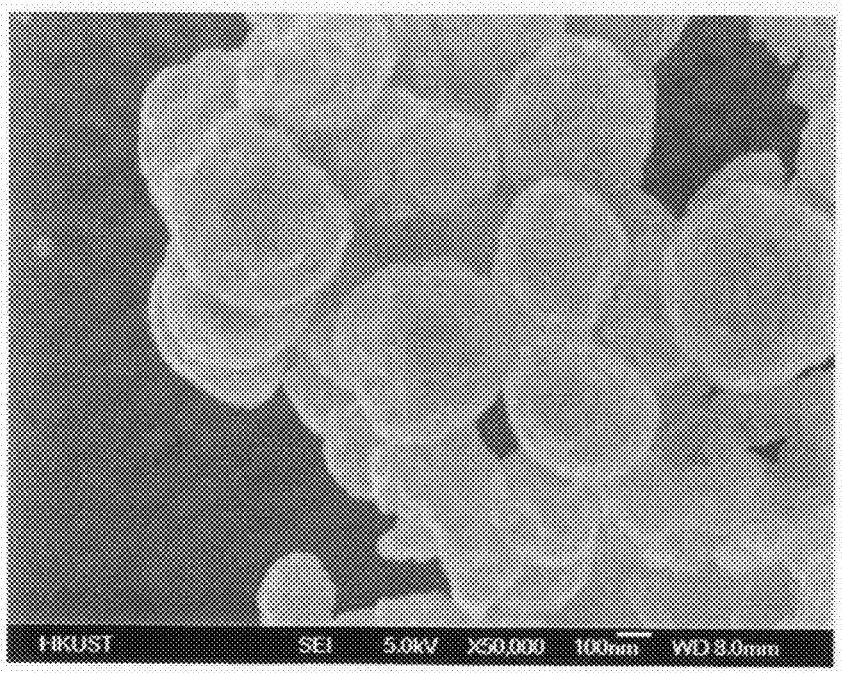
Figure 4:
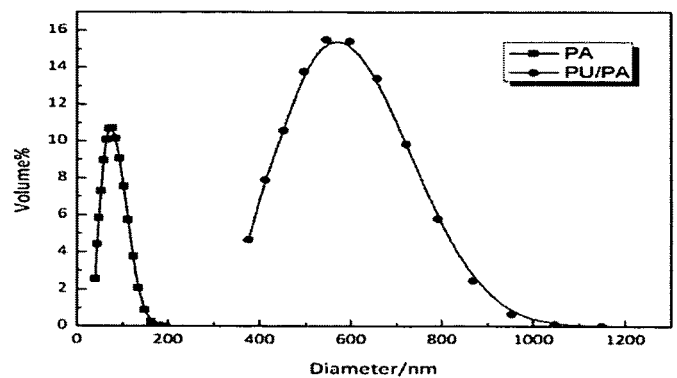
FIG. 4 shows particle size data for the PA emulsions obtained by the method of the present invention.
Figure 4:
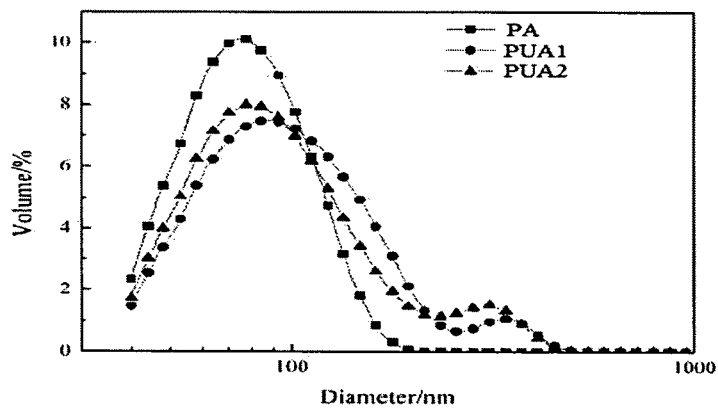
Figure 4:
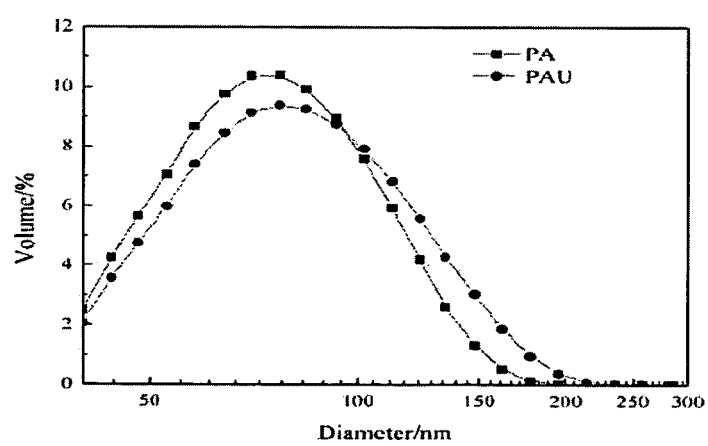

The obtained aqueous polymer emulsion has an average particle diameter of 30 to 300 nm, preferably 70 to 90 nm, more preferably 80 to 85 nm, as measured by a particle size analyzer, Coulter LS 230. FIG. 3 (a) shows the PA particles obtained by the method according to the present invention. FIG. 4 shows the particle size of the PA emulsions obtained by the method of the present invention.

Step 2

Preparation of PU Prepolymer

Any methods to prepare an anionic-type prepolymer of PU are suitable for the preparation of the PU prepolymer according to the present invention. Polyisocyanates, active hydrogen containing compounds such as polyols, water-dispersibility enhancing agents such as hydroxyl-carboxylic acids and extending agents may be used to form the PU prepolymer. In addition, catalysts for polymerization and a small amount of high boiling point solvent may optionally be used.

Polyols, including polyether diols, polyester diols or multi-functional polyols, may be used to prepare the PU prepolymer. "Polyols" means any product having two or more hydroxyl groups per molecule. Non-limiting examples of the polyols useful herein include polyether polyols, polyester polyols such as alkyds, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylate polyols, halogenated polyesters and polyethers, and the like, and mixtures thereof. The polyether polyols, polyester polyols, and polycarbonate polyols are preferred.

The polyether polyols that can be used as the active hydrogen-containing compound according to the present invention contain the —C—O—C— group. They can be obtained in a known manner by the reaction of starting compounds that contain reactive hydrogen atoms such as water or diols, and alkylene oxides such as ethylene oxide, propylene oxide, butylene oxide, styrene oxide, tetrahydrofuran, epichlorohydrin and mixtures thereof. Preferred polyethers include poly (propylene glycol) with molecular weight of 400 to 3000, polytetrahydrofuran and copolymers of poly(ethylene glycol) and poly(propylene glycol). The diols used in the preparation of the polyether polyols include alkylene glycols, preferably ethylene glycol, diethylene glycol and butylene glycol.

The polyester polyols are typically esterification products prepared by the reaction of organic polycarboxylic acids or their anhydrides with a stoichiometric excess of a diol or diols. Non-limiting examples of suitable polyols for use in the reaction include poly(glycol adipate), poly(ethylene terephthalate) polyols, polycaprolactone polyols, alkyd polyols, orthophthalic polyols, sulfonated and phosphonated polyols, and mixtures thereof. The diols used in making the polyester polyols are as set forth for preparing the polyether polyols. Suitable carboxylic acids used in making the polyester polyols include, but are not limited to, dicarboxylic acids, tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and mixtures thereof. Preferred polycarboxylic acids used in making the polyester polyols include aliphatic and/or aromatic dibasic acids.

Particularly interesting polyols are the polyester diols containing the —C(=O)—O— group. Non-limiting examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, as well as propylene glycol maleic anhydride adipic acid polyester diols, and hexane diol neopentyl glycol fumaric acid polyester diols.

Polyisocyanates have two or more isocyanate groups on average, preferably two to four isocyanate groups per molecule. Polyisocyanates typically comprise about 5 to 20 carbon atoms and include aliphatic, cycloaliphatic, aryl-aliphatic, and aromatic polyisocyanates, as well as products of their oligomerization, used alone or in mixtures of two or more. Diisocyanates are preferred. Toluylene diisocyanate, hexamethylene isocyanate and/or isophorone isocyanate may preferably be used in the present invention.

Non-limiting examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Non-limiting examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl)cyclohexane, and the like. Preferred cycloaliphatic polyisocyanates include dicyclohexylmethane diisocyanate and isophorone diisocyanate.

Non-limiting examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Non-limiting examples of suitable aromatic polyisocyanates include 4,4'-diphenylmethylene diisocyanate, toluene diisocyanate, their isomers, naphthalene diisocyanate, their oligomeric forms and the like. A preferred aromatic polyisocyanate is toluene diisocyanate.

Hydroxyl carboxylic acids, as water-dispersibility enhancing agents, are preferably used in the preparation of the PU prepolymer according to the present invention. In the preparation of the PU prepolymer, hydroxyl groups react with isocyanates but the carboxylic groups remain to supply the hydrophilicity to the PU chains. Polyurethanes are generally hydrophobic and not water-dispersible. Therefore, in one embodiment of the present invention, at least one water-dispersibility enhancing compound, such as a carboxylic monomer which has at least one hydrophilic group such as poly(ethylene oxide), ionic or potentially ionic group, is optionally included in the PU prepolymer to assist dispersion of the PU prepolymer as well as the chain-extension of the PU prepolymer in water, thereby enhancing the stability of the dispersions so made. Typically, this is done by incorporating into the polymer chain a compound bearing at least one hydrophilic group or a group that can be made hydrophilic, for example by chemical modifications such as neutralization. This compound may be nonionic, anionic, cationic or zwitterionic in nature. Preferably, anionic groups such as carboxylic acid groups can be incorporated into the prepolymer in an inactive form and subsequently activated by a salt-forming compound, such as a tertiary amine in order to create a prepolymer having an acid number from about 1 to about 60, typically about 1 to about 40, or even 10 to 35 or 12 to 30 or 14 to 25.

In one embodiment of the present invention where the PU prepolymer has carboxylic groups, these carboxylic groups can be converted to carboxylate anions for enhancing the water-dispersibility of the prepolymer. Suitable neutralizing agents for this purpose include tertiary amines, metal hydroxides, ammonium hydroxide, phosphines, and other agents well known to those skilled in the art. Tertiary amines and ammonium hydroxide are preferred, such as triethyl amine (TEA), dimethyl ethanolamine (DEMA), N-methyl morpholine, and the like, and mixtures thereof. It is recognized that primary or secondary amines may be used in place of tertiary amines, if they are sufficiently hindered to avoid interfering with the chain extension process.

Other water-dispersibility enhancing compounds may also be reacted into the prepolymer backbone through urethane linkages or urea linkages, including lateral or terminal hydrophilic ethylene oxide or ureido units.

Water dispersibility enhancing compounds of particular interest are those that can incorporate carboxyl groups into the prepolymer. Normally, they are derived from hydroxy-carboxylic acids having the general formula (HO)xQ(COOH)y, wherein Q is a straight or branched hydrocarbon radical containing 1 to 12 carbon atoms, and x and y are 1 to 3. Non-limiting examples of such hydroxy-carboxylic acids include dimethylolpropanic acid (DMPA), dimethylol butanoic acid (DMBA), citric acid, tartaric acid, glycolic acid, lactic acid, malic acid, dihydroxymaleic acid, dihydroxytartaric acid, and the like, and mixtures thereof. Dihydroxy-carboxylic acids are preferred, of which dimethylolproanoic acid (DMPA) is especially preferred.

Other suitable water-dispersibility enhancing compounds include, but are not limited to, thioglycolic acid, 2,6-dihydroxybenzoic acid, sulfoisophthalic acid (this component would preferably be incorporated as part of a polyester), polyethylene glycol, and the like, and mixtures thereof.

Extending agents are one of most important materials used in the preparation of the PU prepolymer. Multi-hydroxyl compounds with a low molecular weight of <400. Non-limiting examples of the multi-hydroxyl compound with a low molecular weight include ethanediol, propanediol, butanediol, 2-butyne-1,4-diol, trimethylolpropane, tetramethylolmethane, other homologous diols or polyols, and mixtures thereof. 2-butyne-1,4-diol is most preferred. The polyurethane prepolymer is synthesized, with all the hydroxyl components fed into the reactor in a batch. Further, the PU prepolymer is synthesized with no use of organic solvents or with a small amount of a high boiling point solvent to dissolve the solid monomers. The high boiling point solvent, if present, preferably includes N-methyl-2-pyrrolidinone.

2-butyne-1,4-diol (BDO) is a preferred extending agent in this regard. In most applications, the PU hardness needs to be enhanced. Compared to the linear saturated extending agents, such as 1,4-butylene glycol, BDO will promote the polymer hardness for its nonrotatable triple bond.

The PU prepolymer may be formed without using a catalyst if desired, but using a catalyst may be preferred in some embodiments of the present invention. Non-limiting examples of suitable catalysts include stranous octoate, dibutyl tin dilaurate, and tertiary amine compounds such as triethylamine and bis-(dimethylaminoethyl)ether, morpholine compounds, bismuth carboxylate, zinc bismuth carboxylate and diazabicyclo[2.2.2]octane. Organic tin catalysts are preferred.

In the present invention, another important simplification in the preparation is that all the hydroxyl components, including polyols, hydroxyl carboxylic acids and extending agents such as BDO, are fed into a reactor in one batch in the preparation of the PU prepolymer. In most of the existing methods, the polyols and polyisocyanates react first, and then carboxylic acid and extending agents are added. But in most cases, these existing methods necessarily produce products having a very high viscosity and require the use of an organic solvent.

In the present invention, organic solvents, especially the low boiling point solvents, are preferably not used, so the solvent-removing stage is not necessary. However, a small amount of high boiling point solvent may be added in some embodiments of the present invention to dissolve the carboxylic acid monomer (DMBA or DMPA). Furthermore, because the solubility of DMBA is much larger than that of DMPA, DMBA is preferred in the present invention. With DMBA, a very small amount of a high boiling point solvent, N-methyl-2-pyrrolidinone (NMP, b.p. 202~204° C.) can be used for dissolution. The amount of the solvent is about 1.0% (wt) based on the weight of the total dispersion or about 3.5% (wt) based on the solid content in the dispersion. In some cases, at a high reaction temperature, no solvent is needed, because DMBA (melting point 109~112° C.) can be melted at a high temperature and mixed in the polyol liquid.

Step 3

Dispersion and Extension of PU Prepolymer

In one embodiment of the present invention where an anionic PU dispersion is prepared, the prepolymer with carboxylic groups is prepared first, and then the prepolymer is neutralized to form hydrophilic groups (—COO$^-$). Finally, water is added to the system under vigorous agitation. PU particles are formed during the dispersion under high-speed agitation. Before water is added, the prepolymer is in solution or the melted state. It is a homogeneous system. The particles are formed in water because of the balance of the hydrophobic and hydrophilic parts in the PU chains. The agitation speed is very important to the formation of the particles. The shear force of the stirrer determines the particle size. If microparticles are added into the prepolymer solution during the dispersion stage, some of the microparticles are encapsulated or wrapped in the PU particles because the PU particles are formed in situ of the microparticles added.

Accordingly, in one embodiment of the present invention, after finishing the preparation of the PU prepolymer and the neutralization treatment thereof, the PA emulsion prepared in advance is added into the prepolymer melt (solution) under vigorous agitation. The nano-sized PA particles will be dispersed, enwrapped, or adhered to the PU particles. In this case, before the formation of PU particles, PA particles are added into the reactor. The dispersion and the extension take place at the same time. Under vigorous agitation, PU particles are formed. Some of the PA particles are encapsulated in the PU particles, some are adhered to the surface of the later particles and some are dispersed in-between.

In one embodiment of the present invention, a chain extender is employed in this dispersion step. Non-limiting examples of chain extenders useful in this regard include at least one of inorganic or organic polyamines having an average of about 2 or more primary and/or secondary amine groups, amine functional polyols, ureas, or combinations thereof. Suitable organic amines for use as a chain extender include, but are not limited to, diethylene triamine (DETA), ethylene diamine (EDA), meta-xylylenediamine (MXDA), aminoethyl ethanolamine (AEEA), 2-methyl pentane diamine, and the like, and mixtures thereof. Also suitable for the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4, 4-diamino diphenylmethane, sulfonated primary and/or secondary amines, and the like, and mixtures thereof. Suitable inorganic amines include hydrazine, substituted hydrazines, and hydrazine reaction products, and the like, and mixtures thereof. Suitable ureas include urea and its derivatives, and the like, and mixtures thereof. Ethylene diamine is preferably used. The amount of chain extender, which can be added before or after dispersion, typically ranges from about 0.5 to about 1.1 equivalents based on available equivalents of isocyanate.

The amine groups also can be used for the crosslinking between the PA and PU chains. As aforementioned, for the crosslinking of the PU and the PA chains, the active radicals are also introduced into PU chains. In accordance with an embodiment of the present invention, amine groups are preferable. Accordingly, amines are used as an extender and a crosslinker, hence the polyurethane prepolymer can be extended via the excess amine, such as for example, ethylene diamine. Therefore, some amine groups will remain after the extending of the polyurethane. When a PA/PU dispersion is painted and the protected acetoacetoxy groups are recovered with the evaporation of the volatile alkaline such as ammonia during the film drying, amines and acetoacetoxy groups react to form crosslinking.

The PA emulsions, PU prepolymers and PU dispersions according to the present invention as described above can be prepared with various additional ingredients and features in accordance with known PU technology. Examples of the additional ingredients include, but are not limited to, stabilizers, colorants, pigments, dispersants, surfactants, colorants, paraffins, waxes, UV light stabilizers, rheology modifiers, mildewcides, biocides, fungicides, and other conventional additives. Colorants and pigment dispersions, when used, are typically added in amounts up to about 15% by volume of the total composition.

Aqueous PA Modified PU Dispersions

The aqueous PA modified PU dispersions thus obtained by the method as described above preferably have a total solid content in the range of about 20% to about 50% by weight. Also, the weight ratio of dry PA to PU is preferably in the range of about 10:90 to about 90:10.

The modified PU particles are shown in FIG. 3 (b). In FIG. 3 (b), a SEM image of large-sized PA/PU particles is demonstrated so that the structure of the PA/PU particles can be seen clearly. Further, FIG. 4 shows the graphs for particle size of the modified PU particles. FIG. 4 (a) shows the particle size data for the samples demonstrated in FIG. 3 and FIGS. 4 (b) and (c) show the particle size data for other samples from different conditions. With different PA particles and under different polymerization conditions, PA/PU particles with different morphologies can be obtained.

In the hardness test using 3M standard pencil, the hardness of the films or coatings obtained from the aqueous PU dispersions according to the present invention is harder than HB, mostly harder than H as measured by pencil hardness.

In the abrasion-resistance test, the films or coatings obtained from the modified PU dispersions according to the present invention are not fully abraded. Most of the weight loss of the films after abrasion is lower than 20 mg, preferably lower than 10 mg.

Accordingly, the aqueous PA modified PU dispersion according to the present invention is useful to make coatings, adhesives, and films for porous and non-porous substrates such as papers, non-woven materials, textiles, leather, wood, concrete, masonry, metals with or without primer, plastics (e.g., polypropylene, polyester, polyurethane), house wrap and other building materials, fiberglass, polymeric articles, personal protective equipment (such as hazardous material protective apparel, including face masks, medical drapes and gowns, and firemen's turnout gear), and the like. Applications include papers and non-wovens; fibrous materials; films, sheets, composites, and other articles; inks and printing binders; flock and other adhesives; personal care products such as skin care, hair care, and nail care products; livestock and seed applications; and the like. A preferred embodiment is use as a mar and scratch resistant interior or exterior coating, such as plastics coatings for vehicles and/or consumer electronics and/or wood floor coatings. A most preferred embodiment is use as woodenware coatings. As coating compositions, they may be applied by consumers or professionals by any conventional method including brushing, dipping, flow coating, spraying, and the like.

In addition, the aqueous PA modified PU dispersion according to the present invention can be used as an adhesive or to augment or supplement adhesive types well known to those skilled in the art. For example, particular adhesive properties can be achieved by varying the type and amount of isocyanate(s) present; the type, amount, and molecular weight of polyol(s) present; and the amount of poly(alkylene oxide) side chain units present.

EXAMPLES

The present invention can be illustrated in further detail by the following examples. However, it should be noted that the scope of the present invention is not limited to these examples. In the examples and throughout the specification, all parts and percentages are by weight, unless otherwise indicated.

Examples 1 to 4

Preparation of PA Emulsion

Examples 1 through 4 show the preparation of PA emulsions with varying chemical compositions. The detailed formulations of the examples are listed in Table 1. All the samples are manufactured with the same feeding strategy.

Into a clean dry four-neck round-bottom flask equipped with an agitator, thermometer and feeding funnels was charged 130 parts of water, 80 percent of the emulsifier and 30 percent of the initiator. The reactor was installed in an oil bath and held the inner temperature in the reactor around 75° C. The mixture of monomers and the initiator solution were respectively fed into the reactor dropwise for 3.5 hours. The initiator solution comprises 70 percent of the initiator, 20 percent of emulsifier and 60 parts of water. Then reaction mixture was held at the temperature of 85 to 90° C. for another 2 hours to complete the polymerization. Finally, the oil bath was removed and the polymer emulsion was allowed to cool down to ambient temperature.

TABLE 1

Formulations for the preparation of PA emulsion

| | Example Nos. | | | |
|---|---|---|---|---|
| | 1 | 2 | 3 | 4 |
| MMA | 90 | 97.5 | 95 | 60 |
| BA | 0 | 0 | 0 | 34 |
| HEMA | 10 | 0 | 5 | 6 |
| TMPTA | 0 | 0 | 0 | 1 |
| AA | 0 | 2.5 | 0 | 0 |
| SDS | 1.0 | 1.0 | 2.0 | 1.2 |
| APS | 0.6 | 0.6 | 0.6 | 0.6 |
| DDI | 190 | 190 | 190 | 190 |
| TSC | 34.2 | 35.4 | 34.9 | 35.3 |

Note 1:
MMA: methyl methacrylate; BA: butyl acrylate; HEMA: 2-hydrxoyethyl methacrylate; AA: acrylic acid; TMPTA: trimethylol propane triacrylate; SDS: Sodium dodecyl sulfate; APS: ammonium persulfate; DDI: double deionic water; TSC: total solid content.
Note 2:
In Table 1, each raw chemical is used in "weight part". The total usage of monomers including MMA, BA, TMPTA, HEMA and AA is 100 weight parts and the other chemicals including SDS, APS and DDI are measured according to the monomer weight. The TSC (total solid content) is in weight percentage.

Examples 5 to 9

Preparation of Aqueous PA/PU Hybrid Dispersion

Examples 5 to 9 show the preparation of aqueous PA/PU hybrid dispersions. Table 2 lists the detailed formulations.

Into a clean dry four-neck round-bottom flask equipped with an agitator, thermometer, nitrogen inlet and outlet tubes was charged all the PPG, DMBA, BDO and NMP. The reactor mixture was heated to 80° C. with an oil bath in nitrogen atmosphere. All isocyanate (TDI or IPDI) was then added into the reactor in a batch. The content in the reactor was raised to the temperature of 90° C. for TDI, and 100° C. for IPDI. The reaction of IPDI and polyols was carried out with organic tin catalyst to accelerate the reaction. The condensation polymerization lasted for 5 hours. Then the contents in the reactor were cooled to 75-80° C. and TEA was added to neutralize the carboxylic groups. After 20 to 30 minutes of neutralization reaction, the content was further cooled to near the ambient temperature if the viscosity permitted. The agitation speed was adjusted to about 1500 rpm and the weighed PA emulsion was added into the reactor and the vigorous agitation was kept for half an hour. During the dispersion, a little EDA could be added to the dispersion to consume the residual isocyanate groups. After the dispersion, the agitation speed was slowed down to 800 rpm and the dispersion was held at 60° C. for another hour. Finally, the dispersion was cooled to ambient temperature. All of the PA modified PU hybrid dispersions contained no VOC, according to the Hong Kong standard HKEPL-004-2002.

TABLE 2

Formulation of the preparation aqueous PA/PU hybrid dispersion

| | Example Nos. | | | | |
|---|---|---|---|---|---|
| | 5 | 6 | 7 | 8 | 9 |
| PPG-1000 | 20.0 | 20.0 | 20.0 | 20.0 | 0 |
| PPG-2000 | 0 | 0 | 0 | 0 | 40 |
| DMBA | 2.4076 | 2.4076 | 2.4076 | 2.4076 | 2.4076 |
| BDO | 0.4305 | 0.4305 | 0.4305 | 0.4305 | 0.4305 |
| TDI | 14.368 | 14.368 | 14.368 | 0 | 0 |

TABLE 2-continued

Formulation of the preparation aqueous PA/PU hybrid dispersion

| | Example Nos. | | | | |
|---|---|---|---|---|---|
| | 5 | 6 | 7 | 8 | 9 |
| IPDI | 0 | 0 | 0 | 16.505 | 16.505 |
| TEA | Equal chemical equivalent to DMBA. | | | | |
| EDA | 0.35 | 0.35 | 0.35 | 0.35 | 0.35 |
| PA emulsion | 56.4/No. 1 | 56.0/No. 2 | 56.0/No. 3 | 56.0/No. 3 | 170/No. 4 |
| DDI | 93.6 | 95.0 | 94.0 | 94.0 | 140 |
| NMP | 2 mL | 2 mL | 2 mL | 2 mL | 3.75 mL |
| TSC (wt. %) | 30.0 | 30.0 | 30.0 | 30.0 | 31.0 |

Note 1:
PPG: poly(propylene glycol); PPG-1000: PPG with average molecular weight of 1000; PPG-2000: PPG with average molecular weight of 2000; DMBA: dimethylol butyric acid; BDO: 2-butyne-1,4-diol; TDI: toluene diisocyanate; IPDI: isophorone isocyanate; TEA: triethylene amine; EDA: ethylene diamine; NMP: N-methyl-2-pyrrolidinone
Note 2:
In Table 2, each raw chemical and the PA emulsion is used in "weight part".

Examples 10 to 14

Preparation of PA Emulsion

Examples 10 through 14 show the preparation of PA emulsions with varying chemical composition. The detailed formulations of the examples are listed in Table 3. All the samples are manufactured with the same feeding strategy.

Into a clean dry four-neck round-bottom flask equipped with an agitator, thermometer and feeding funnels, feeding 1 was charged. The reactor was installed in an oil bath and held the inner temperature in the reactor around 75° C. Then the mixed monomer feeding 2 and half of the initiator solution feeding 3 were respectively fed into the reactor dropwise in 2 hours. Subsequently feeding 4 and the residual half of feeding 3 were respectively fed into the reactor dropwise in 2 hours. The reaction mixture was held at the temperature of 85 to 90° C. for another 2 hours to complete the polymerization. Finally, the oil bath was removed and the polymer emulsion was allowed to cool down to ambient temperature. The pH was adjusted to 9 by aqueous ammonia solution (28%).

TABLE 3

Formulation for the preparation of PA emulsions

| Examples Nos. | Feeding 1 | | Feeding 2 | | Feeding 3 | | Feeding 4 | |
|---|---|---|---|---|---|---|---|---|
| 10 | SDS | 1.6 | SDS | 0.4 | MMA | 42.5 | MMA | 40 |
| | APS | 0.2 | APS | 0.4 | AA | 2.5 | HEMA | 5 |
| | DDI | 120 | DDI | 70 | EA | 5 | EA | 5 |
| 11 | SDS | 1.6 | SDS | 0.4 | MMA | 42.5 | MMA | 37.5 |
| | APS | 0.2 | APS | 0.4 | AA | 2.5 | HEMA | 5 |
| | DDI | 120 | DDI | 70 | EA | 5 | AAEM | 2.5 |
| | | | | | | | EA | 5 |
| 12 | SDS | 1.6 | SDS | 0.4 | MMA | 42.5 | MMA | 30 |
| | APS | 0.2 | APS | 0.4 | AA | 2.5 | HEMA | 5 |
| | DDI | 120 | DDI | 70 | EA | 5 | AAEM | 7.5 |
| | | | | | | | EA | 5 |
| 13 | SDS | 1.6 | SDS | 0.4 | MMA | 42.5 | MMA | 30 |
| | APS | 0.2 | APS | 0.4 | AA | 2.5 | HEMA | 5 |
| | DDI | 120 | DDI | 70 | BA | 5 | AAEM | 7.5 |
| | | | | | | | BA | 5 |

Note 1:
MMA: methyl methacrylate; EA: ethyl acrylate; BA: butyl acrylate; HEMA: 2-hydrxoyethyl methacrylate; AA: acrylic acid; SDS: Sodium dodecyl sulfate; APS: ammonium persulfate; DDI: double deionic water; AAEM: acetoacetoxyethyl methacrylate.
Note 2:
In Table 3, each raw chemical is used in "weight part".

Example 14 to 18

Preparation of Aqueous PA/PU Hybrid Dispersion

Examples 14 to 18 show the preparation of aqueous PA/PU hybrid dispersion. Table 4 lists the detailed formulations.

Into a clean dry four-neck round-bottom flask equipped with an agitator, thermometer, and nitrogen inlet and outlet tubes was charged all the PPG, DMBA, BDO and NMP. The reactor mixture was heated to 80° C. with an oil bath in nitrogen atmosphere. All isocyanate (TDI or IPDI) was then added into the reactor in one batch. The content in the reactor was raised to the temperature of 90° C. for TDI, and 100° C. for IPDI. The reaction of IPDI and polyols should be carried out with organic tin catalyst to accelerate the reaction. The condensation polymerization should last for 5 hours. Then the contents in the reactor should be cooled to 75-80° C. and TEA was added to neutralize the carboxylic groups. After 20 to 30 minutes of neutralization reaction, the content was further cooled to near the ambient temperature if the viscosity permitted. The agitation speed was adjusted to about 1000 rpm and the weighed PA emulsion was added into the reactor and the vigorous agitation should be kept for half an hour. During the dispersion, a little EDA could be added to the dispersion to consume the residual isocyanate groups and to introduce the reactive groups (amine) for acetoacetoxy groups in PA chains. After the dispersion, the agitation speed was slowed down to 800 rpm and the dispersion was held at 60° C. for another hour. Finally, the dispersion was cooled to ambient temperature. All of the PA modified PU hybrid examples contained no VOC according to the Hong Kong standard HKEPL-004-2002.

TABLE 4

Formulation of the preparation of aqueous PA/PU hybrid dispersion

| | Example Nos. | | | | |
|---|---|---|---|---|---|
| | 14 | 15 | 16 | 17 | 18 |
| PPG-1000 | 20.0 | 20.0 | 20.0 | 20.0 | 0 |
| PPG-2000 | 0 | 0 | 0 | 0 | 40 |
| DMBA | 2.4076 | 2.4076 | 2.4076 | 2.4076 | 2.4076 |
| BDO | 0.4305 | 0.4305 | 0.4305 | 0.4305 | 0.4305 |
| TDI | 14.368 | 14.368 | 14.368 | 0 | 0 |
| IPDI | 0 | 0 | 0 | 16.505 | 16.505 |
| TEA | Equal chemical equivalent to DMBA. | | | | |
| EDA | 0.35 | 0.35 | 0.35 | 0.35 | 0.35 |
| PA emulsion | 53.65/ No. 1 | 53.65/ No. 2 | 53.65/ No. 3 | 56.70/ No. 3 | 56.70/ No. 4 |
| DDI | 94.60 | 94.60 | 94.60 | 100.00 | 100.0 |
| NMP | 2 mL | 2 mL | 2 mL | 2 mL | / |
| TSC (wt. %) | 30.0 | 30.0 | 30.0 | 30.0 | 30.2 |

Note 1:
PPG: poly(propylene glycol); PPG-1000: PPG with average molecular weight of 1000; PPG-2000: PPG with average molecular weight of 2000; DMBA: dimethylol butyric acid; BDO: 2-butyne-1,4-diol; TDI: toluene diisocyanate; IPDI: isophorone isocyanate; TEA: triethylene amine; EDA: ethylene diamine; NMP: N-methyl-2-pyrrolidinone
Note 2:
In Table 4, each raw chemical and the PA emulsion is used in "weight part".

Test for the PA Emulsion and Modified PU Dispersion

Particle Size and Distribution

The particle sizes and their distributions of the examples 1 to 9 were tested with a "Coulter LS230" particle size analyzer. The diameters obtained are the hydrodynamic sizes. The average diameters are listed in Table 5.

TABLE 5

Comparison of the average particle size of PA emulsions and PU dispersions.

| Example Nos. | 1 | 2 | 3 | 4 | 5 | 6 | 7 | 8 | 9 |
|---|---|---|---|---|---|---|---|---|---|
| Particle size(nm) | 83.5 | 82.4 | 84.5 | 80.3 | 173 | 89.9 | 118 | 115 | 600 |

The particle sizes and their distributions of the examples 10 to 18 were tested with a "Brookhevan ZetaPlus" laser particle size analyzer. The diameters obtained are the hydrodynamic sizes. The average diameters are listed in Table 6.

TABLE 6

Comparison of the average particle size of the PA emulsions and PU dispersions.

| Example Nos. | 10 | 11 | 12 | 13 | 14 | 15 | 16 | 17 | 18 |
|---|---|---|---|---|---|---|---|---|---|
| Particle size (nm) | 52.2 | 68.8 | 72.5 | 75.5 | 86.7 | 125.4 | 141.9 | 79.6 | 81.2 |

FIG. 3 shows SEM images of PA particles and the modified PU particles. In FIG. 3 (b), large-sized PA/PU particles are demonstrated so that the structure of the PA/PU particles can be seen clearly. In addition, FIG. 4 shows the graphs for particle size of the PA and PA/PU particles. FIG. 4 (a) shows the particle size data for the samples demonstrated in FIG. 3. FIGS. 4 (b) and (c) show the particle size data for other samples from different conditions. With different PA particles and under different polymerization conditions, PA/PU particles with different morphologies could be obtained.

Hardness and Abrasion-Resistance

The film of modified PU was formed for a period of about 1.5 hours under ambient temperature. The surface of the film was then dried. The dried film was baked under 120° C. for 5 minutes to accelerate the drying. The hardness and abrasion-resistance were then tested according to the GB/T1768 and GB/T6739, respectively. The hardness was tested with 3M standard pencil. The abrasion resistance was tested on a JM-1V Paints Abrasion Tester, which is made by Shanghai Pusheng Chemical Machine Co. The results are listed in Table 7.

TABLE 7

Hardness and abrasion-resistance of modified PU film

| Example Nos. | 5 | 6 | 7 | 8 | 9 | Pure PU |
|---|---|---|---|---|---|---|
| Pencil hardness | >H | ~2H | 2H | HB~H | HB~H | 5B~2B |
| Abrasion resistance/mg | 15 | 18 | 9.0 | 8.8 | 5.0 | Destroyed |

For the pure PU films with the same chemical compositions to the modified PU but without PA, its pencil hardness is about 5 B to 2 B, varied with the formulation, especially depending on the TDI or IPDI used. However, the hardness of the modified PU films is higher than HB, most of the films is harder than H.

The film of modified PU was formed for a period of about 1.5 hours under ambient temperature. The surface of the film was then dried. The dried film was baked under 120° C. for 5 minutes to accelerate the drying. The pencil hardness, pendulum hardness and abrasion-resistance were then tested according to the GB/T1768 and GB/T6739, respectively. The pencil hardness was tested with 3M standard pencil. The pendulum hardness was tested on a QBY-II Paints Pendulum Hardness Tester, which is made by Tianjin Yonglida Materials Testers Co. The abrasion resistance was tested on a JM-1V Paints Abrasion Tester, which is made by Shanghai Pusheng Chemical Machine Co. The results are listed in Table 8.

TABLE 8

Hardness and abrasion-resistance of modified PU film

| Example Nos. | 14 | 15 | 16 | 17 | 18 | Pure PU |
|---|---|---|---|---|---|---|
| Pencil hardness(7 d) | HB | H | 2H | H | H~2H | 5B~2B |
| Pendulum hardness(12 h) | 0.40 | 0.40 | 0.40 | ~0.40 | 0.32 | / |
| Pendulum hardness(48 h) | 0.55 | 0.60 | >0.60 | 0.57 | 0.60 | / |
| Abrasion resistance(7 d)/mg | <30 | <20 | <30 | <30 | <30 | Destroyed |

For the pure PU films with the same chemical compositions to the modified PU but without PA, its pencil hardness is about 5 B to 2 B, varied with the formulation, especially depending on the TDI or IPDI used. However, the hardness of the modified PU films is higher than HB, most of the films is harder than H.

For the abrasion-resistance testing, pure PU film was fully abraded and substrate of the film was shown. The modified PU film was not fully abraded. Most of the weight losses of the film after abrasion were lower than 20 mg, some were lower than 10 mg.

The film of modified PU dispersion according to the present invention was also compared with a commercial product A obtained from Hong Kong (Qingyi(清怡)™ from China Paint MFG. Co. (Shenzhen)) and a commercial product B obtained overseas (Product B: Dulux™ from ICI). The results are listed in Table 9.

TABLE 9

Hardness and abrasion-resistance of modified PU film as Compared to Commercial Products

| | Abrasion-resistance/mg | Alcohol-resistance | Heat-resistance | Pencil hardness | Appearance of dispersion |
|---|---|---|---|---|---|
| Examples 5-9 | 6~20 | Pass | 1 | HB~2H | Stable, bluish or milky white emulsion |
| Product A | 10.0 | Pass | 1 | ≈H | Brown viscous emulsion; redispersible sedimentation |
| Product B | 8.0 | Pass | 1 | HB~H | Stable, milky white emulsion |

From the results, it can be said that the properties of the PA/PU dispersion prepared according to the present invention can well substitute the commercial products.

Water Resistance

Figure 5:
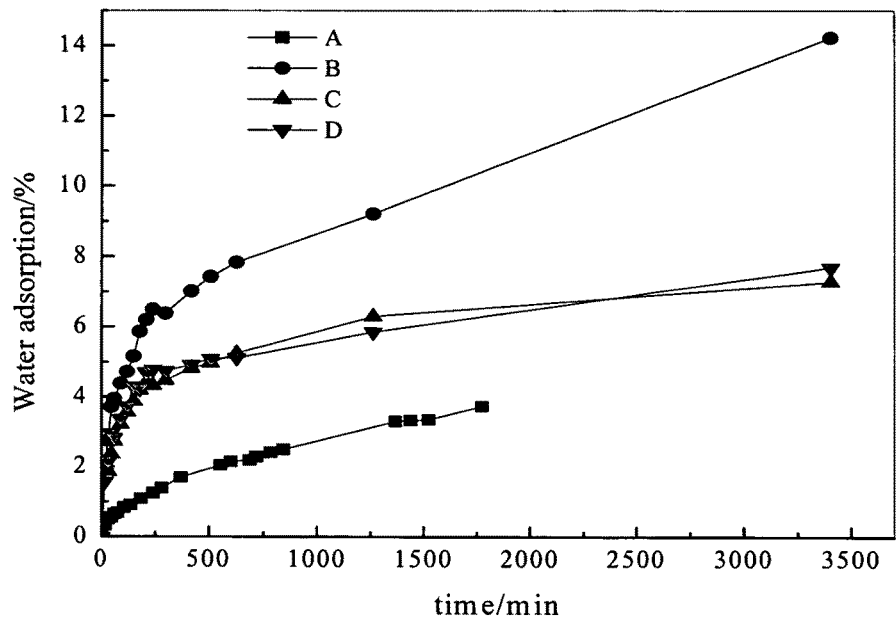
FIG. 5 shows the water-resistance of the film obtained from the modified PA/PU dispersion according to the present invention and the film obtained from the pure PU dispersion according to prior art.
Figure 5:
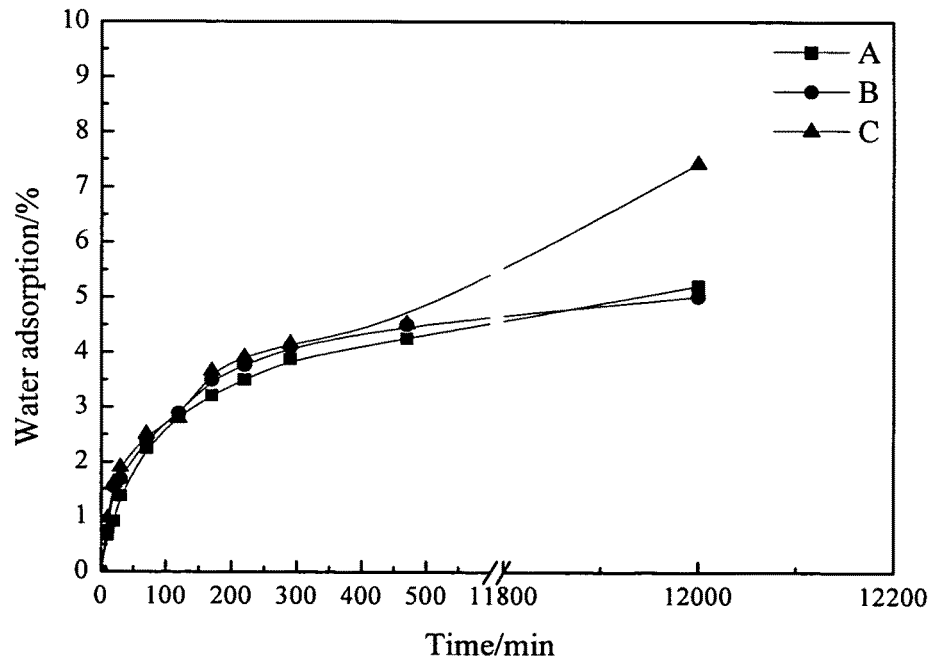

The film of modified PU formed was tested as compared to the film of pure PU. The polymer dispersion was casted into a PTFE mould to form a polymer film. All the tested samples were with the same dimensions. After the fully drying of the films, part of the film was cut and weighed and then soaked in de-ionic water. The increases in weight of the soaked polymer films were recorded with the time. The results are shown in FIG. 5. The water-resistance is expressed by the water-absorption of polymer film sunk in water. For pure PU shown in FIG. 5 (a), in 60 hours, the water-adsorption of some samples increased up to 15%. On the contrary, for the modified PU, the highest water-adsorption was only 7% after 200 hours. It shows that the modification can enhance the water-resistance of PU.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention.

We claim:

1. A method of preparing an aqueous polyacrylate modified polyurethane dispersion, which comprises:
   a) preparing a polyacrylate emulsion having an average particle diameter of 30 to 300 nm, the polyacrylate emulsion comprising a monomer mixture of methyl methacrylate (MMA), butyl acrylate (BA), trimethylol propane triacrylate (TMPTA), 2-hydroxyethyl methacrylate (HEMA), and acrylic acid (AA) and an initiator mixture of sodium dodecyl sulfate (SDS), ammonium persulfate (APS), and double deionic water (DDI), further comprising feeding the monomer mixture and initiator mixture into a reactor dropwise, holding, and then cooling;
   b) preparing a polyurethane prepolymer using polyisocyanates, hydroxyl carboxylic acids and extending agents, further comprising adding toluene diisocynanate (TDI) or isophorone isocyanate (IPDI) to a mixture of poly (propylene glycol) (PPG), dimethylol butyric acid (DMBA), 2-butyne-1,4-diol (BDO), and N-methyl-2-pyrrolidinone (NMP), raising the temperature, carrying out a condensation polymerization with organic tin catalyst, cooling, adding triethylene amine (TEA) to neutralize carboxylic groups, and then cooling; and
   c) dispersing and extending said polyurethane prepolymer in the presence of said polyacrylate emulsion under agitation greater than 1000 rpm to produce a hybrid emulsion, further comprising adjusting agitation and agitating, adding ethylene diamine (EDA) during dispersion to consume residual isocyanate groups, slowing agitation and holding, and then cooling;
   wherein the weight ratio of dry polyacrylate to polyurethane is in the range of about 10:90 to about 90:10; and
   wherein the total solid content of modified polyurethane dispersion is in the range of about 20% to about 50%.

2. The method according to claim 1, wherein the polyurethane prepolymer contains carboxylic groups.

3. The method according to claim 1, wherein the extending agent is a multi-hydroxyl compound with a low molecular weight of <400.

4. The method according to claim 3, wherein the multi-hydroxyl compound with a low molecular weight is homologous diols or polyols.

5. The method according to claim 1, wherein the polyurethane prepolymer is synthesized by feeding all the hydroxyl components into a reactor in a batch.

6. The method according to claim 1, wherein the polyacrylate emulsion is added into the polyurethane prepolymer in a batch under high speed agitation.

7. A method of preparing an aqueous polyacrylate modified polyurethane dispersion with self-crosslinkability, which comprises:
   a) preparing a polyacrylate polymer or copolymer emulsion with functional groups having an average particle diameter of 30 to 300 nm, further comprising feeding a monomer mixture of methyl methacrylate (MMA), butyl acrylate (BA), trimethylol propane triacrylate (TMPTA), 2-hydroxyethyl methacrylate (HEMA), and acrylic acid (AA) and an initiator mixture of sodium dodecyl sulfate (SDS), ammonium persulfate (APS), and double deionic water (DDI) into a reactor dropwise, holding, and then cooling;
   b) preparing a polyurethane prepolymer with carboxylic acid using hydroxyl carboxylic acids, extending agents and polyisocyanates, further comprising adding toluene diisocynanate (TDI) or isophorone isocyanate (IPDI) to a mixture of poly(propylene glycol) (PPG), dimethylol butyric acid (DMBA), 2-butyne-1,4-diol (BDO), and N-methyl-2-pyrrolidinone (NMP), raising the temperature, carrying out a condensation polymerization with organic tin catalyst, cooling, adding triethylene amine (TEA) to neutralize carboxylic groups, and then cooling; and c) dispersing and extending said polyurethane prepolymer in the presence of said polyacrylate emulsion under agitation greater than 1000 rpm to produce a hybrid emulsion, further comprising adjusting agitation and agitating, adding ethylene diamine (EDA) during dispersion to consume residual isocyanate groups, slowing agitation and holding, and then cooling;

wherein the weight ratio of dry polyacrylate to polyurethane is in the range of about 10:90 to about 90:10; and wherein the total solid content of modified polyurethane dispersion is in the range of about 20% to about 50%.

8. The method according to claim 7, wherein the functional group is acetoacetoxy group.

9. The method according to claim 7, wherein the polyacrylate copolymer is prepared by copolymerization of an unsaturated acetoacetoxy compound with (metha)acrylates and/or other vinyl monomers.

10. The method according to claim 9, wherein the unsaturated acetoacetoxy compound is acetoacetoxyethyl methacrylate.

11. The method according to claim 7, the polyacrylate emulsion is adjusted to alkaline condition.

12. The method according to claim 11, a volatile alkaline compound is used for the alkaline condition.

13. The method according to claim 7, wherein the extending agent is a multi-hydroxyl compound with low molecular weight of <400.

14. The method according to claim 13, wherein the multi-hydroxyl compound with low molecular weight is homologous diols or polyols.

15. The method according to claim 7, wherein the polyurethane prepolymer is synthesized by feeding all the hydroxyl components into a reactor in a batch.

16. The method according to claim 7, wherein the polyacrylate emulsion is added into the polyurethane prepolymer in a batch under high speed agitation.

17. The method according to claim 7, wherein ethylene diamine is added after the dispersion is completed.

18. A method of preparing an aqueous polyacrylate modified polyurethane dispersion, which comprises:

a) preparing a polyacrylate emulsion having an average particle diameter of 30 to 300 nm, the polyacrylate emulsion comprising a monomer mixture of methyl methacrylate (MMA), butyl acrylate (BA), trimethylol propane triacrylate (TMPTA), 2-hydroxyethyl methacrylate (HEMA), and acrylic acid (AA) and an initiator mixture of sodium dodecyl sulfate (SDS), ammonium persulfate (APS), and double deionic water (DDI), further comprising feeding the monomer mixture and initiator mixture into a reactor dropwise for 3.5 hours, holding at 85-90° C. for another 2 hours, and then cooling to ambient temperature;

b) preparing a polyurethane prepolymer using polyisocyanates, hydroxyl carboxylic acids and extending agents, further comprising adding toluene diisocynanate (TDI) or isophorone isocyanate (IPDI) to a mixture of poly (propylene glycol) (PPG), dimethylol butyric acid (DMBA), 2-butyne-1,4-diol (BDO), and N-methyl-2-pyrrolidinone (NMP) at 80° C., raising the temperature to 90° C. for TDI or 100° C. for IPDI, carrying out a condensation polymerization with organic tin catalyst for 5 hours, cooling to 75-80° C., adding triethylene amine (TEA) to neutralize carboxylic groups for 20-30 minutes, and then cooling to near ambient temperature; and c) dispersing and extending said polyurethane prepolymer in the presence of said polyacrylate emulsion under agitation greater than 1000 rpm to produce a hybrid emulsion, further comprising adjusting agitation to 1500 rpm and agitating for 30 minutes, adding ethylene diamine (EDA) during dispersion to consume residual isocyanate groups, slowing agitation to 800 rpm and holding at 60° C. for 1 hour, and then cooling to ambient temperature;

wherein the weight ratio of dry polyacrylate to polyurethane is in the range of about 10:90 to about 90:10; and wherein the total solid content of modified polyurethane dispersion is in the range of about 20% to about 50%.

* * * * *